(12) United States Patent
Carpenter et al.

(10) Patent No.: US 11,642,973 B2
(45) Date of Patent: May 9, 2023

(54) SCHEDULED AUTOMOTIVE BATTERY CHARGE DEFAULT TO NOW

(71) Applicant: Ford Global Technologies, LLC, Dearborn, MI (US)

(72) Inventors: Toussaint Carpenter, Westland, MI (US); Charles Everett Badger, II, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 317 days.

(21) Appl. No.: 16/983,660

(22) Filed: Aug. 3, 2020

(65) Prior Publication Data
US 2022/0032788 A1 Feb. 3, 2022

(51) Int. Cl.
*B60L 53/00* (2019.01)
*B60L 58/12* (2019.01)

(52) U.S. Cl.
CPC .............. *B60L 53/00* (2019.02); *B60L 58/12* (2019.02)

(58) Field of Classification Search
CPC ................................ B60L 53/00; B60L 58/12
See application file for complete search history.

(56) References Cited

U.S. PATENT DOCUMENTS

| | | | | |
|---|---|---|---|---|
| 5,594,318 A * | 1/1997 | Nor | .......... | B60L 53/12 320/108 |
| 9,533,597 B2 * | 1/2017 | Li | .............. | B60L 3/12 |
| 9,623,761 B2 * | 4/2017 | Gale | ........ | B60L 53/62 |
| 9,751,427 B2 * | 9/2017 | Loftus | ........... | H02J 7/0016 |
| 9,975,446 B2 * | 5/2018 | Weber | ........ | B60L 53/68 |
| 9,994,120 B2 | 6/2018 | Yu et al. | | |
| 10,369,887 B2 * | 8/2019 | Garcha | ........... | B60L 3/0046 |
| 2011/0202221 A1 | 8/2011 | Sobue et al. | | |
| 2017/0093211 A1 | 3/2017 | Nakagawa | | |

\* cited by examiner

*Primary Examiner* — Gertrude Arthur Jeanglaude
(74) *Attorney, Agent, or Firm* — David B. Kelley; Brooks Kushman P.C.

(57) ABSTRACT

A charge system for a vehicle includes a traction battery and a controller. The controller, responsive to passage of a predetermined period of time following activation of the vehicle without detecting a wake up signal, sets a diagnostic flag. The controller further, responsive to deactivation of the vehicle, presence of the diagnostic flag, and presence of a request designating a future start time for a charge event of the traction battery, initiates the charge event regardless of the future start time. The controller may further, responsive to deactivation of the vehicle, absence of the diagnostic flag, and presence of the request designating the future start time for the charge event of the traction battery, inhibit start of the charge event until the future start time.

16 Claims, 2 Drawing Sheets

Fig-1

SCHEDULED AUTOMOTIVE BATTERY CHARGE DEFAULT TO NOW

TECHNICAL FIELD

This disclosure relates to the strategies for charging an automotive vehicle.

BACKGROUND

Certain vehicles, among other things, may include a traction battery and one or more electric motors for propulsion. The traction battery is the source of power for the one or more electric motors. These vehicles may provide a user the ability to schedule charging of the traction battery provided they are plugged in or suitably arranged with a wireless charging system. A user, for example, may plug in their vehicle after returning home in the evening and set a charge time for the traction battery to begin at 2 AM.

SUMMARY

A vehicle includes a traction battery, a first controller that, responsive to activation of the vehicle, generates a wake up signal, and a second controller. The second controller, responsive to passage of a predetermined period of time following the activation of the vehicle without detecting the wake up signal, sets a diagnostic flag, and responsive to deactivation of the vehicle, presence of the diagnostic flag, and presence of a request designating a future start time for a charge event of the traction battery, initiates the charge event regardless of the future start time.

A method for controlling battery charging of a vehicle includes, responsive to activation of the vehicle, generating a wake up signal, responsive to passage of a predetermined period of time following the activation of the vehicle without detecting the wake up signal, setting a diagnostic flag, and responsive to deactivation of the vehicle, presence of the diagnostic flag, and presence of a request designating a future start time for a charge event of the traction battery, initiating the charge event regardless of the future start time.

A charge system for a vehicle includes a traction battery and a controller. The controller, responsive to passage of a predetermined period of time following activation of the vehicle without detecting a wake up signal, sets a diagnostic flag, and responsive to presence of the diagnostic flag, initiates a charge event of the traction battery.

DETAILED DESCRIPTION

Figure 1:
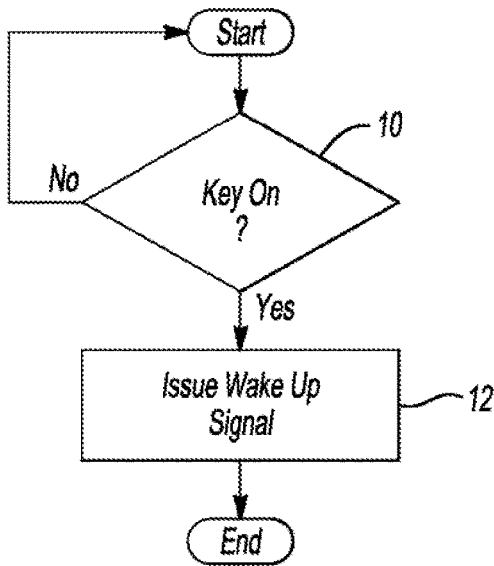
FIGS. 1 and 2 are flow charts of algorithms for performing diagnostic operations responsive to a vehicle being activated.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Chargeable vehicles (e.g., plug-in electric vehicles, hybrid plug-in electric vehicles, electric vehicles with wireless charging capabilities, etc.) may include a variety of controllers that perform different tasks. Examples of such controllers include body control modules, brake control modules, central timing modules, general electronic modules, hybrid powertrain control modules, and suspension control modules. Their names are sometimes indicative of their functionality.

When a vehicle is deactivated (in a key off state), its controllers typically enter a low power mode (sleep mode). One or more of the controllers, however, may be programmed to periodically become active and wake up other of the controllers to perform certain tasks during key off. These controllers may remain active for a certain period of time before returning to their low power mode. A body control module, for example, may be programmed to periodically become active during key off and issue wake up signals via a Controller Area Network (CAN) or otherwise to a hybrid powertrain control module. Once active, the hybrid powertrain control module may be tasked with initiating any scheduled traction battery charge events that are to take place at that time. If, for example, a user has scheduled a traction battery charge event to take place between 2 AM and 5 AM, and the hybrid powertrain control module becomes active (is woken up) at 12 AM, it will inhibit steps to initiate charging of the traction battery. If the hybrid powertrain control module becomes active at 2:05 AM, it will take steps to initiate charging of the traction battery according to the schedule.

Faults may occur that prevent communication between controllers during key off. Continuing with the example above, if such a fault prevents the body control module's wake up communication from reaching the hybrid powertrain control module, the hybrid powertrain control module may not become active during key off as normally expected, and may be unable to initiate any traction battery charge event scheduled to take place during key off.

Controller diagnostics may be performed when a vehicle is first activated (at key on). Such activation results in its controllers becoming active. One diagnostic may include the body control module issuing a wake up signal, and other controllers waiting to detect such wake up signal. If, for example, the hybrid powertrain control module does not detect the wake up signal from the body control module within a predefined duration (e.g., 30 seconds, 45 seconds, etc.) of the vehicle being first activated, the hybrid powertrain control module may set a diagnostic flag. This diagnostic flag may prompt the hybrid control module to initiate any scheduled charge event following key off and before entering its lower power mode regardless of when the charge event is scheduled to take place. If, for example, the charge event is scheduled to take place between 4 AM and 7 AM, the hybrid powertrain control module will nonetheless initiate the charge event after key off before it enters its low power mode regardless of time of day.

Presence of the diagnostic flag indicates the hybrid powertrain control module may not be able to receive the wake up signal from the body control module. That is, the hybrid powertrain control module may not be able to wake up during key off to initiate any scheduled charge event. Thus, the hybrid powertrain control module initiates the charge event while it is still awake before entering low power mode.

With reference to FIG. 1, a controller, e.g., a body control module, detects whether the vehicle has been activated in known fashion at operation 10. Signals, for example, may be broadcast on any accessible communication network (e.g., CAN, Ethernet, etc.) indicating that the vehicle has been activated. If no, the algorithm returns. If yes, the controller issues a wake up signal at operation 12. The algorithm then ends.

Figure 2:
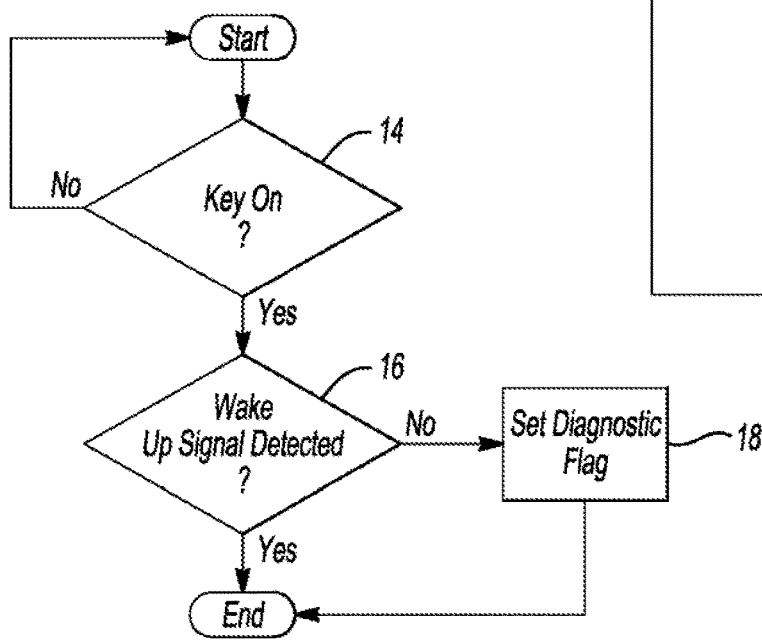

With reference to FIG. 2, a controller, e.g., a hybrid powertrain control module, detects whether the vehicle has been activated in known fashion at operation 14. If no, the algorithm returns. If yes, the controller waits for a predetermined duration to detect whether a wake up signal is received at operation 16. If no, the controller sets a diagnostic flag at operation 18. The diagnostic flag may take any suitable form: a certain register value in memory, a periodic signal, etc. If yes, the algorithm ends.

Figure 3:
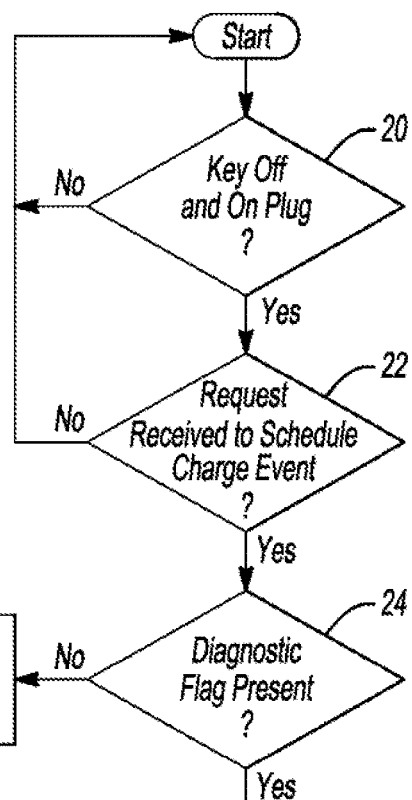
FIG. 3 is a flow chart of an algorithm for controlling a charge system of an automotive vehicle.

With reference to FIG. 3, a controller, e.g., a hybrid powertrain control module, detects in known fashion whether the vehicle has entered key off and is on plug or able to receive wireless charge at operation 20. Signals, for example, may be broadcast on any accessible communication network (e.g., CAN) indicating that the vehicle has been deactivated and is on plug or able to receive wireless charge. If no, the algorithm returns. If yes, the controller detects in known fashion whether a request has been received to schedule a charge event at operation 22. A user, for example, may have entered via a display or otherwise a desired charge window. This input may be communicated to the controller in known fashion. If no, the algorithm returns. If yes, the controller detects whether a diagnostic flag (set at operation 18 of FIG. 2) is present at operation 24. If yes, the controller sets charge programming to initiate charging-regardless of the scheduled time period for charging input by the user. The controller then enters its low power mode at operation 28, and the algorithm ends. Returning to operation 24, if no, the controller sets the charge programming to inhibit the start of charging until the schedule time period for charging input by the user is achieved at operation 30. The algorithm then proceeds to operation 28.

Figure 4:
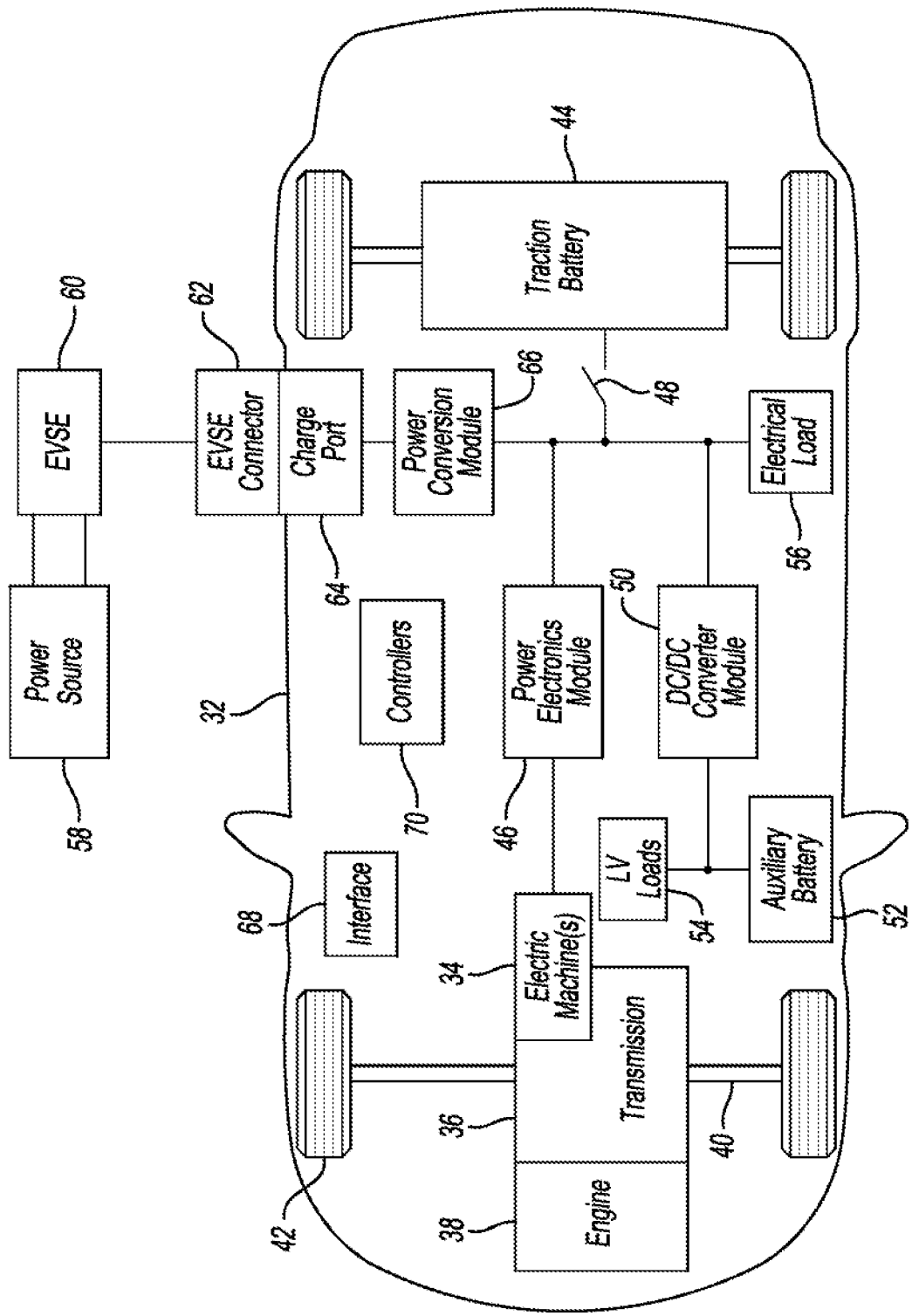
FIG. 4 is a schematic diagram of an automotive vehicle.

With reference to FIG. 4, an electrified vehicle 32 (e.g., a plug-in hybrid-electric vehicle) includes one or more electric machines 34 mechanically coupled to a hybrid transmission 36. The electric machines 34 may operate as a motor or generator. In addition, the hybrid transmission 36 is mechanically coupled to an engine 38 and drive shaft 40. The drive shaft 40 is mechanically coupled to wheels 42. The electric machines 34 can provide propulsion and slowing capability when the engine 38 is turned on or off. The electric machines 34 may also act as generators and can provide fuel economy benefits by recovering energy that would normally be lost as heat in a friction braking system. The electric machines 34 may also reduce vehicle emissions by allowing the engine 38 to operate at more efficient speeds and allowing the electrified vehicle 32 to be operated in electric mode with the engine 38 off under certain conditions. The electrified vehicle 32 may also be a battery electric vehicle. In such a configuration, the engine 38 may not be present. Other arrangements are also contemplated.

A traction battery or battery pack 44 stores energy that can be used by the electric machines 34. The vehicle battery pack 44 may provide a high voltage direct current (DC) output. The traction battery 44 may be electrically coupled to one or more power electronics modules 46. One or more contactors 48 may isolate the traction battery 44 from other components when opened and connect the traction battery 44 to other components when closed. The power electronics module 46 is also electrically coupled to the electric machines 34 and provides the ability to bi-directionally transfer energy between the traction battery 44 and the electric machines 34. For example, the traction battery 44 may provide a DC voltage while the electric machines 34 may operate with a three-phase alternating current (AC). The power electronics module 46 may convert the DC voltage to a three-phase AC current to operate the electric machines 34. In a regenerative mode, the power electronics module 46 may convert the three-phase AC current from the electric machines 34 acting as generators to the DC voltage compatible with the traction battery 44.

In addition to providing energy for propulsion, the traction battery 44 may provide energy for other vehicle electrical systems. The electrified vehicle 32 may include a DC/DC converter module 50 that converts the high voltage DC output of the traction battery 44 to a low voltage DC supply that is compatible with low-voltage vehicle loads. An output of the DC/DC converter module 50 may be electrically coupled to an auxiliary battery 52 (e.g., 12V battery) for charging the auxiliary battery 52. Low-voltage systems 54 may be electrically coupled to the auxiliary battery 52. One or more electrical loads 56 may be coupled to the high-voltage bus. The electrical loads 56 may have an associated controller that operates and controls the electrical loads 56 when appropriate. Examples of the electrical loads 56 include a fan, electric heating element, and air-conditioning compressor.

The electrified vehicle 32 may be configured to recharge the traction battery 44 from an external power source 58. The external power source 58 may be a connection to an electrical outlet, an electrical power distribution network, or a grid as provided by an electric utility company. The external power source 58 may be electrically coupled to a charger or electric vehicle supply equipment (EVSE) 60. The EVSE 60 may provide circuitry and controls to regulate and manage the transfer of energy between the power source 58 and electrified vehicle 32. The external power source 58 may provide DC or AC electric power to the EVSE 60. The EVSE 60 may have a charge connector 62 for plugging into a charge port 64 of the electrified vehicle 32. The charge port 64 may be any type of port configured to transfer power from the EVSE 60 to the electrified vehicle 32. The charge port 64 may be electrically coupled to a charger or on-board power conversion module 66. The power conversion module 66 may condition the power supplied from the EVSE 60 to provide the proper voltage and current levels to the traction battery 44. The power conversion module 66 may interface with the EVSE 60 to coordinate the delivery of power to the electrified vehicle 32. The EVSE connector 62 may have pins that mate with corresponding recesses of the charge port 64. Alternatively, various components described as being electrically coupled or connected may transfer power using wireless inductive coupling.

Controllers/interfaces/modules in the electrified vehicle 32 may communicate via one or more vehicle networks. The vehicle network may include a plurality of channels for communication. One channel of the vehicle network may be a serial bus such as a CAN. One of the channels of the vehicle network may include an Ethernet network defined by the institute of Electrical and Electronics Engineers 802 family of standards. Additional channels of the vehicle network may include discrete connections between modules and may include power signals from the auxiliary battery 52. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 4 but the vehicle network may connect to any electronic module that is present in the electrified vehicle 32.

The electrified vehicle 32 may thus include an interface 68 (e.g., touch screen, cellular transceiver, etc.) configured to receive user input defining a desired charge time, and a plurality of controllers 70 (e.g., a body controller, brake controller, central timing controller, hybrid powertrain controller, suspension controller, etc.). One or more of these controllers 70 may perform the algorithms contemplated herein.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. Although examples herein were described with reference to a body control module and hybrid powertrain control module, the strategies contemplated herein may of course be applied to any set of controllers tasked with waking up during key off and initiating scheduled battery charge activities.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a traction battery;
a first controller programmed to, responsive to detecting an activation of the vehicle, generate a wake up signal; and
a second controller programmed to,
responsive to passage and expiration of a predetermined period of time without detecting the wake up signal, set a diagnostic flag, wherein the predetermined period of time starts with detecting the activation of the vehicle, and
responsive to detecting a deactivation of the vehicle, the diagnostic flag, and a request designating a future start time for a charge event of the traction battery, initiate the charge event regardless of the future start time.

2. The vehicle of claim 1, wherein the second controller is further programmed to, responsive to detecting the deactivation of the vehicle, absence of the diagnostic flag, and the request designating the future start time for the charge event of the traction battery, inhibit start of the charge event until the future start time.

3. The vehicle of claim 1, wherein the first controller is a body controller.

4. The vehicle of claim 1, wherein the second controller is a hybrid powertrain controller.

5. The vehicle of claim 1 further comprising an interface configured to receive the request designating a future start time for a charge event of the traction battery.

6. A method for controlling battery charging of a vehicle, comprising:
by one or more controllers,
responsive to detecting an activation of the vehicle, generating a wake up signal,
responsive to passage and expiration of a predetermined period of time without detecting the wake up signal, setting a diagnostic flag, wherein the predetermined period of time starts with detecting the activation of the vehicle, and
responsive to detecting a deactivation of the vehicle, the diagnostic flag, and a request designating a future start time for a charge event of a traction battery, initiating the charge event regardless of the future start time.

7. The method of claim 6 further comprising, responsive to detecting the deactivation of the vehicle, absence of the diagnostic flag, and the request designating the future start time for the charge event of the traction battery, inhibiting start of the charge event until the future start time.

8. The method of claim 6, wherein the one or more controllers include a body controller.

9. The method of claim 6, wherein the one or more controllers include a hybrid powertrain controller.

10. The method of claim 6 further comprising receiving the request designating the future start time for the charge event of the traction battery.

11. A charge system for a vehicle comprising:
a traction battery; and
a controller programmed to responsive to passage and expiration of a predetermined period of time that starts with an activation of the vehicle without detecting a wake up signal, set a diagnostic flag, and responsive to detecting of the diagnostic flag, initiate a charge event of the traction battery.

12. The charge system of claim 11 further comprising another controller programmed to, responsive to detecting the activation of the vehicle, generate the wake up signal.

13. The charge system of claim 12, wherein the another controller is a body controller.

14. The charge system of claim 11, wherein the controller is further programmed to, responsive to detecting a deactivation of the vehicle, absence of the diagnostic flag, and a request designating a future start time for the charge event of the traction battery, inhibit start of the charge event until the future start time.

15. The charge system of claim 14 further comprising an interface configured to receive the request designating a future start time for the charge event of the traction battery.

16. The charge system of claim 11, wherein the controller is a hybrid powertrain controller.

\* \* \* \* \*